H. J. HOLLY.
HARVESTER.
APPLICATION FILED MAR. 23, 1908.

921,110.

Patented May 11, 1909.
2 SHEETS—SHEET 1.

WITNESSES:

INVENTOR
Henry J. Holly
BY
ATTORNEY

H. J. HOLLY.
HARVESTER.
APPLICATION FILED MAR. 23, 1908.

921,110.

Patented May 11, 1909.
2 SHEETS—SHEET 2.

WITNESSES:
H. B. Burr.
Ila Haydank.

INVENTOR
Henry J. Holly.
BY
G. C. Kennedy
ATTORNEY.

UNITED STATES PATENT OFFICE.

HENRY J. HOLLY, OF BEAMAN, IOWA.

HARVESTER.

No. 921,110.    Specification of Letters Patent.    Patented May 11, 1909.

Application filed March 23, 1908. Serial No. 422,617.

*To all whom it may concern:*

Be it known that I, HENRY J. HOLLY, a citizen of the United States of America, and a resident of Beaman, Grundy county, Iowa, have invented certain new and useful Improvements in Harvesters, of which the following is a specification.

My invention relates to improvements in harvesters, and the object of my improvements is to provide a double-sickle machine, with a single overhung frame having means for vertical adjustment, and connection to a source of propulsion, and adapted to cut either a wide swath by the use of both sickles together, or a narrower swath on either side by the use of either sickle singly as desired.

Other improvements in matters of detail intended to effect the above purpose, are more specifically described in the body of the specification.

The object above set forth is accomplished by the means and mechanism which is hereinafter described and claimed, and which is fully illustrated in the accompanying drawings, in which:—

Figure 1:
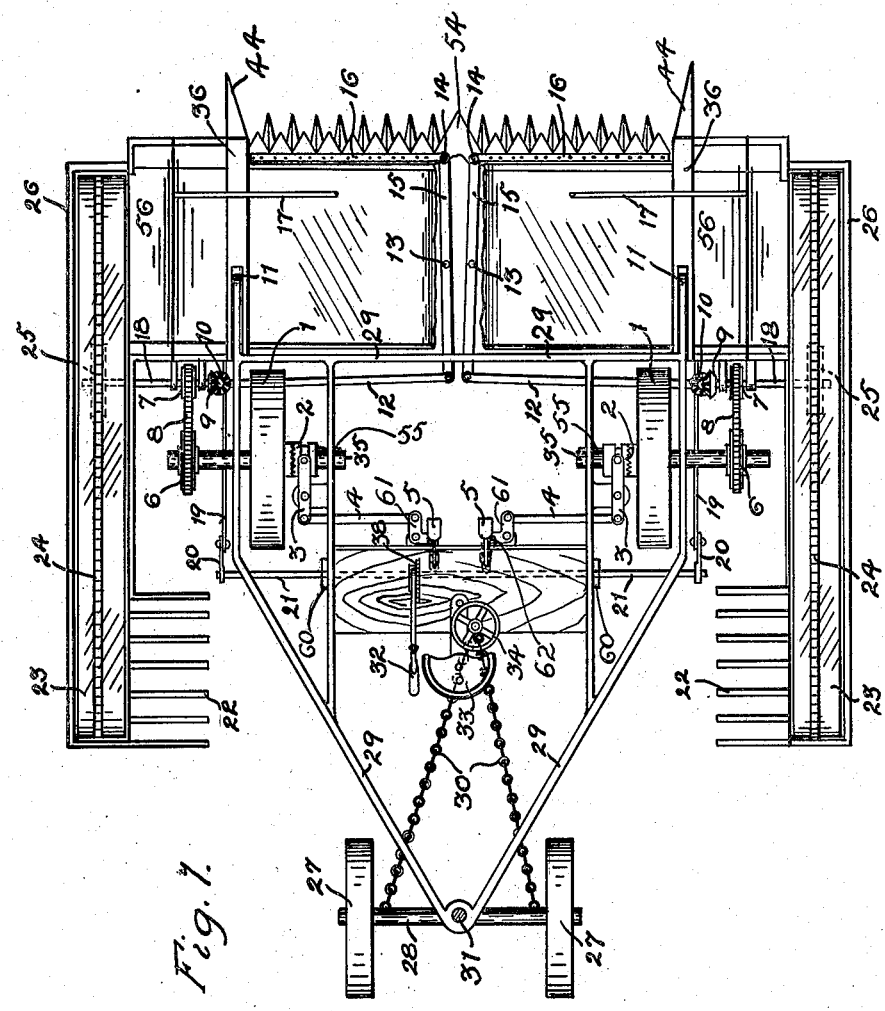
Figure 3:
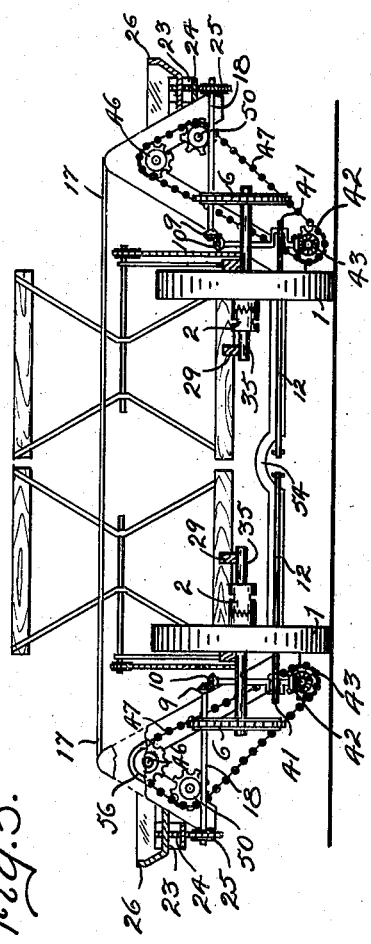
Figure 2:
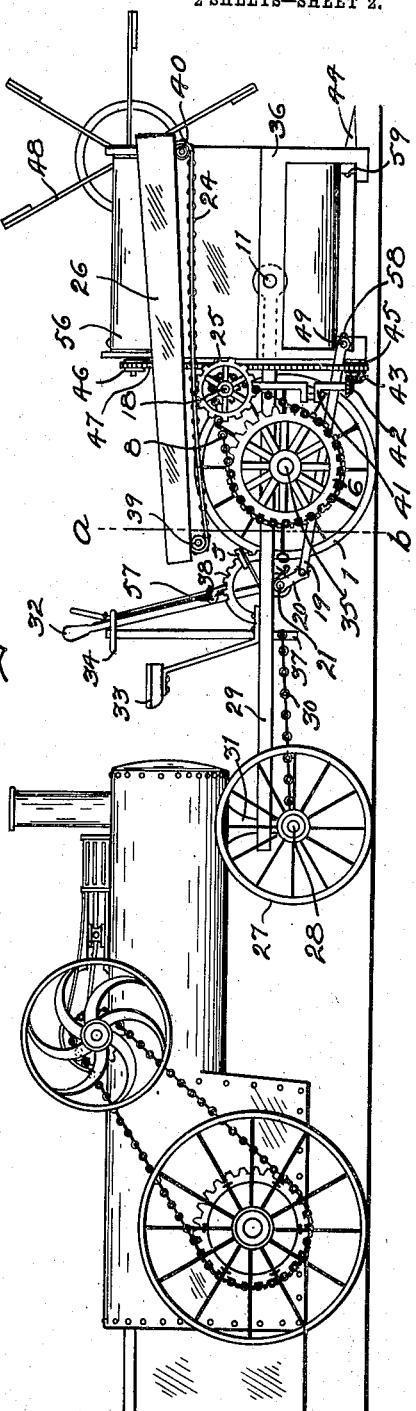

Figure 1 is an upper plan view of my improved harvester, without any specific means for binding being shown. Fig. 2 is a right-hand side elevation of the same. Fig. 3 is a rear elevation of the same.

Similar numbers refer to similar parts throughout the several views.

The supporting-frame of my improved harvester consists of two parts, in front and rear respectively, shown at 36 and 29. The part 29 is formed of a V-shaped bar strengthened near its front by a transverse brace, as well as by two longitudinally placed braces extending from the V-shaped portion forward to connect with the transverse brace. The forward part 36 of the frame is composed of two connected sections the outer and upper rear corners of which are slotted to receive the forwardly extending ends of the V-shaped bar 29, the ends of the bar 29 having eyes whereby they are pivoted on short spindles extending across said slots. The forward ends of the lower part of the frame 36 are pointed at 44 and extend in advance of the sickles 16, serving to deflect the standing stems of the grain toward said sickles.

The frame-parts 36 have on each side depending portions which support transverse bars 58 and 59, the latter holding up from the ground the sickle-casings and the superincumbent transverse movable aprons 56 and their connections.

The forward part of the frame 36 may be adjusted vertically to raise or lower the sickle-bars 16 to a desired distance from the ground by the following means, easily controlled by the operator seated on the seat 33. A hand-lever 32 has a hand-controlled pawl 57 adapted to removably engage the detents on the semi-circular rack-bar 38 in the usual manner. The lower end of said lever is fixed to a transverse rock-shaft 21, whose ends are adapted to rock in hangers 60 from the frame of the machine. Arms 20 are fixed to each end of the rock-shaft 21, and their lower ends are pivoted to links or connecting-rods 19, the forward ends of the latter being pivoted on studs 49 extending from the rear downward projections of the frame section 36. When the hand-lever 32 is moved forward, by means of said intermediate connections the forward part of the frame section 36 is lowered, bringing the sickle-bars 16 nearer the ground, while throwing the lever 32 backward raises the sickle-bars.

The harvester is mounted on carrying-wheels as follows: The rear angle of the V-shaped frame 29 has a vertical bearing-orifice to receive the king-bolt 31, the latter being projected from the axle 28 of the carrying-wheels 27, the latter being the front carrying-wheels of a traction-engine (not otherwise shown) used to propel said harvester about. The operator seated on the seat 33, can by turning a hand-wheel 34 in either direction change the direction of forward movement of said harvester at will. The vertical shaft 37 of said hand-wheel has its lower end connected with a chain or cable 30, which is adapted to be wound about it, thus shifting the position of the axle 28, to which the ends of said chain are attached. The forward part of the harvester is supported on the carrying-wheels 1, which are adapted to run loosely on the horizontal shafts 35. The inner face of the hub of each shaft is dentated to fit corresponding dentations on one face of a clutch-sleeve 2, the latter being mounted on said shaft to rotate therewith, and slide longitudinally over a feather or key 55. When the clutches aforesaid are moved to engage the dentated hubs of the said wheels 1, the wheels rotate the shafts 35. The clutches 2 may be thrown separately and independent of each other by the following means: Foot-treadles 5 pivoted independently to the frame, have a link-connection 62 each to one member of a bell-crank lever 61, the other member of the latter being pivotally connected to one end of a link 4, whose other end is pivotally connected to the rear end of a forked lever 3. The forward tines of the lever 3 engage a peripheral groove in the clutch-sleeve 2. When either treadle 5 is depressed, by means of the said connections the clutch-sleeve is thrown into engagement with its adjacent wheel 1.

Each shaft 35 carries a sprocket-wheel 6, and a sprocket chain 8 connects the wheel 6 with the smaller sprocket-wheel 7 fixed to a horizontal shaft 18. A sprocket-wheel 25 on the outer end of the shaft 18 is adapted to operatively engage the lower portion of a sprocket-chain 24 which runs over idlers 39 and 40 on each side, and carries the side movable conveyer-aprons 23, the latter moving within a limiting side frame 26. Grain delivered to the side aprons 23 by the transverse elevating aprons 56, is carried to the rear and ejected over the inwardly-directed fingers 22. The inner end of each shaft 18 has a bevel-pinion 9 adapted to intermesh with a bevel-gear wheel 10 on the upper end of a vertical shaft provided with a crank 41. The lower end of each crank-shaft has a bevel-pinion 42 adapted to intermesh with a bevel-gear wheel 43, the latter on the rear end of a short longitudinal shaft carrying a sprocket-wheel 45. A sprocket-chain 47 leading about each wheel 45 also drives the sprocket-wheels 46 and 50. The sprocket-wheel 46 drives a shaft which in turn operates to drive a movable conveyer-apron 56 on one side of the machine, leading from the sickles to the longitudinal apron 23. If desired any suitable binding-mechanism may be located above the wheel 50 and driven by it, but is not shown, not being an essential part of my invention. To each crank 41 is pivoted the outer end of a pitman 12, whose inner end is pivotally-connected to the rear end of a lever 15 medially pivoted or fulcrumed on a stud 18. The forward end of each lever 15 is pivotally connected with the inner end of a sickle-bar 16, and the latter is transversely reciprocated by the movement of the former derived from said crank, and the carrying-wheel 1 on the same side. It is obvious that by means of the independent connections shown, either sickle may be driven independent of the other, or both may be driven together if desired, when both of the clutches 2 are thrown into engagement with the carrying-wheels 1. Thus the operator may cut a wide swath through a field of standing grain, by using both sickles with rear propulsion, without in any way prostrating the grain before cutting. He can also cut with one sickle alone when finishing up a field, or working in an irregularly-shaped inclosure.

The forward parts of the machine are well braced together by the transverse bars 17 and 54, and the whole machine is easily turned about in a short compass by means of the steering-gear shown, and the arrangement of the carrying-wheels with different widths of tread.

Having described my invention, what I claim as new, and desire to secure by Letters Patent, is:

1. In a harvester, in combination, a two-part frame the parts of which are pivotally connected, means for adjusting the height of the forward part thereof from the ground, propelling means pivotally connected to the said frame, guiding means for altering the line of movement of the machine, independent reciprocatory sickles mounted in alinement transversely along the forward edge of the machine, carrying-wheels idly mounted on separated shafts in the forward part of the machine, separated rotatable shafts, clutches slidably but non-rotatably mounted on said shafts and adapted to removably engage and be connected to said carrying-wheels, means for shifting said clutches independently into and out of engagement and connection with said carrying-wheels to cause said wheels to independently rotate said shafts on which they are mounted, and connecting means between each shaft and its adjacent sickle adapted to change the rotatory movement of the former into a reciprocating movement of the latter.

2. In a harvester, in combination, a two-part frame the parts of which are pivotally connected, means for adjusting the height of the forward part thereof from the ground, propelling means pivotally connected to the said frame, guiding means for altering the direction of movement of the machine, independent reciprocatory sickles mounted in alinement transversely along the forward edge of said machine, carrying-wheels idly mounted on separated shafts in the forward part of the machine, separated rotatable shafts, clutches slidably but non-rotatably mounted on said shafts and adapted to removably engage and be connected to said carrying wheels, means for shifting said clutches independently into and out of engagement and connection with said carrying-wheels to cause said wheels to independently rotate said shafts on which they are mounted, connecting means between each shaft and its adjacent sickle adapted to change the rotatory movement of the former into a reciprocatory movement of the latter, and means adapted to transfer the cut grain from each sickle to the adjacent side of the machine and deliver it to the rear thereof on the same side.

Signed at Beaman, Iowa, this 11" day of March, 1908.

HENRY J. HOLLY.

Witnesses:
　THOMAS SIMMS,
　M. A. ARTZ.